E. S. LAMMERS, Jr.
CONTROL SYSTEM.
APPLICATION FILED MAR. 8, 1919.
1,411,043. Patented Mar. 28, 1922.
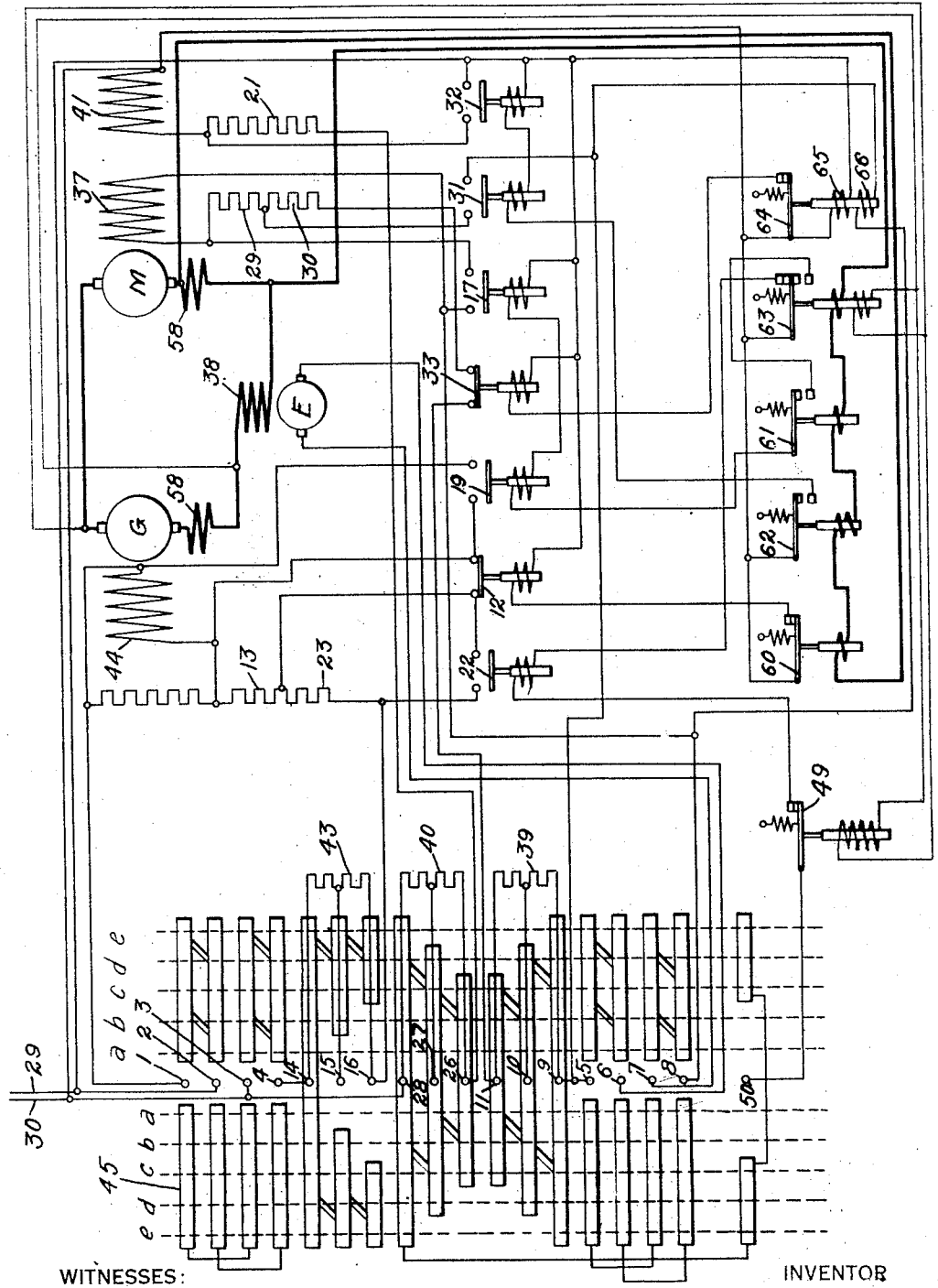
WITNESSES:
J. A. Helsel,
David Rines
INVENTOR
Edwin S. Lammers, Jr.
BY
Wesley G. Carr
ATTORNEY

UNITED STATES PATENT OFFICE.

EDWIN S. LAMMERS, JR., OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,411,043.

Specification of Letters Patent.   Patented Mar. 28, 1922.

Application filed March 8, 1919.   Serial No. 281,528.

*To all whom it may concern:*

Be it known that I, EDWIN S. LAMMERS, Jr., a citizen of the United States, and a resident of Wilkinsburg, in the county of Allegheny and State of Pennsylvania, have invented a new and useful Improvement in Control Systems, of which the following is a specification.

My invention relates to control systems for dynamo-electric machines, and it has particular relation to a control system comprising a generator, a motor in a closed circuit, such as that forming the subject-matter of my co-pending application, Serial No. 281,525, filed March 8, 1919.

The object of my invention is to provide an improved control system of the above-designated character.

According to the system constituting the subject-matter of my above-mentioned application, the armatures of the generators and the motors are connected in series with the field magnet winding of an exciter which supplies energy to variable-potential field-magnet windings for the motors. The generators are provided, and the motors are further provided, with constant-potential field-magnet windings. Resistors in circuit with the windings are controlled for accelerating and decelerating purposes. The connections of the generator and the variable-potential windings may be reversed, but the direction of current-flow through the variable-potential windings remains the same because the direction of current flow through the exciter armature is also reversed.

According to the present invention, not only the resistors, but the generator and the variable-potential field-magnet windings as well, may be short-circuited. Permanent resistors are placed in circuit with these windings to prevent injury to the exciters which energize these windings when the windings are short-circuited. These resistors may be usefully employed to further the operation at times when the windings are in circuit. As there is danger of the motor field-magnet windings sometimes opposing each other, I provide for opening the circuit of the variable-potential windings when such danger is present. The transformer effect of one of the motor windings upon the other is also availed of under predetermined conditions. During deceleration, I provide for "forcing" the strengthening of the motor-field-magnet windings.

The single figure of the accompanying drawing is a diagrammatic view of circuits and apparatus embodying my invention.

The armatures of a generator G and a motor M are connected in series with the field-magnet winding 38 of an exciter E, which supplies current to variable-potential field-magnet windings 37 for the motor M. I have illustrated a single motor and a single generator. In practice, however, two motors and two generators are usually employed, the armatures of which are alternately connected together in series.

Resistors 29, 30 and 39 are adapted to be connected in series with the motor-field-magnet winding 37, resistors 21 and 40 are connected in series with the motor-field-magnet winding 41, and resistors 13, 23 and 43 are adapted to be connected in series with the generator-field-magnet winding 44. The motor-field-magnet winding 41 and the generator-field-magnet winding 44 are connected to any suitable source of constant voltage by line conductors 29 and 30. The voltage applied to the motor-field-magnet winding 37 is variable, since the voltage of the exciter E varies in accordance with the current traversing the main circuit comprising the motor and the generator armatures. The direction of the current traversing the generator-field-magnet winding 44 may be reversed. The connections of the variable-potential winding 37 to the terminals of the exciter E may also be reversed.

In practice, the reversing connections are effected, and the resistors 39, 40 and 43 are controlled, by electromagnetic switches through the medium of a controller 45. The resistor 43, moreover, is adapted to be controlled in such manner, illustrated in my above-mentioned application, as to "force" the excitation of the field-magnet winding 44. In order to simplify the drawing, I have omitted the electromagnetic switches and the "field-forcing" means from the present disclosure. It will be understood, however, that the present disclosure is to be read in the light of the disclosure in my above-mentioned application.

The resistor 13 is normally short-circuited by an electromagnetic switch 12, and the resistor 23 is adapted to be controlled by an electromagnetic switch 22, during acceleration, when the voltage of the generator is below a predetermined value. The resistors 30 and 39 are adapted to be short-circuited by an electromagnetic switch 31 and the resistors 21 and 40 are adapted to be short-circuited by an electromagnetic switch 32. The field-magnet windings 44 and 37 are respectively adapted to be short-circuited by electromagnetic switches 19 and 17, under predetermined conditions, during deceleration. In order not to injure the exciter E and the exciter which supplies the windings 41 and 44 with energy, the resistors 29 and 23, which may be termed "permanent" resistors, are provided. These resistors 23 and 29 may, however, be employed for additional purposes, and the resistor 23 is actually so employed. A switch 33 controls the connections of the armature of the exciter E to the variable-potential winding 37.

The actuating coil of the switch 22 is controlled by a relay 49, which is adapted to be opened by an actuating coil connected across the terminals of the generator armature when the voltage of the generator exceeds a predetermined value. The switch 12 is controlled by a relay 60, the switches 19 and 17 by a relay 61 and the switches 31 and 32 by a relay 62, each of the relays 60, 61 and 62 being provided with an actuating coil connected across some reactance or resistance device in circuit with the armatures, such as the compensating or the commutating windings 58 of one of the motors or one of the generators. The relay 61 should be designed to operate at a higher current value than the relay 62, and the relay 62 should be designed to operate at a lower value than the relay 60. A relay 63 is provided with a pair of actuating coils, one of which is connected in the same manner as the coils of the relays 60, 61 and 62, and the other of which, like the coil of the relay 49, is connected across the terminals of the generator armature. The two coils of the relay 63 are designed to oppose each other normally, during acceleration, but to aid each other during deceleration. The voltage coil, of course, need not necessarily be connected across the terminals of the generator armature, but may be connected in any other desired manner. When the two coils of the relay 63 oppose each other, the relay 63 is maintained in one position to control the operation of the switch 22. When they aid each other, the relay is actuated to a second position to control the switches 17 and 19 when the relay 61 occupies its actuated position. The switch 33 is controlled by a relay 64 having a pair of opposing coils 65 and 66, one of which is connected across the same line conductors 30 and 39, which lead to the constant-voltage source of the motor windings 41, and the other of which is connected to the terminals of the armature of the exciter E.

The controller 45 is illustrated as of the drum type, adapted for operation, in opposite directions from a central position, to any one of a number of operative positions a, b, c, d, e. The various contact fingers are adapted to engage contact members 1, 2, 3 and 4 for the purpose of controlling the polarity of the field-magnet winding 44, contact members 5, 6, 7 and 8 for controlling the connections of the exciter E to the field-magnet windings 37, contact members 9, 10 and 11 for controlling the resistor 39, contact members 14, 15 and 16 for controlling the resistor 43, and contact members 26, 27 and 28 for controlling the resistor 40. The actuating coil of the switch 22 is controlled by contact segments which are adapted to engage a contact member 50 after the resistor 43 has been short-circuited.

In the illustrated position of the controller 45, the motor and generator are at rest. The motor-field-magnet winding 41 is energized since it is permanently connected to the line conductors 29 and 30, which are the terminals of the constant-potential source. The field-magnet windings 37 and 44 are de-energized because their circuits are open at the contact fingers 1 to 4, and 5 to 8, inclusive.

To start the system, the controller 45 may be assumed to be actuated toward the right to the position a. A circuit will thus be established from the line conductor 29, through the contact member 2, the controller 45, the contact members 4 and 14, the resistor 43, the contact member 16, the resistor 23, the field-magnet winding 44, the contact member 1, the controller 45 and the contact member 3, to the line conductor 30. The resistor 13 is short-circuited by its switch 12. In this position of the controller, as well as in the "off" position, the resistors 40 and 39 are short-circuited. The exciter circuit is also closed, in this position of the controller, the circuit extending from one terminal of the exciter armature, through the contact finger 7, the controller 45, the contact members 5, 9, 10 and 11, the switch 33, which is closed when the coils 65 and 66 are both energized because these coils oppose each other, the resistors 30 and 29, the field-magnet winding 37, the contact member 8, the controller 45 and the contact member 6 to the other terminal of the exciter E. The circuit of the coil 66 may be traced from the contact member 8, which is connected to one terminal of the exciter armature, through the coil 66, to the contact member 5, which is connected to the other terminal of the exciter armature. As explained above, the coil 65 is directly connected to the line conductors 29 and 30.

The generator-field-magnet winding 44 and the motor-field-magnet winding 37 are thus excited to a degree depending upon the load when the controller 45 occupies the position a and the motor is started.

In the positions b and c of the controller 45, portions of the resistor 43 are successively short-circuited in order to increase the field excitation of the generator. The generator voltage increases correspondingly to increase the speed of the motor to a corresponding degree.

It will be understood that, in actual practice, the connections of the field-magnet windings 37 and 44 and the short-circuiting of the resistor 43 are, as above stated, effected through electromagnetic switches which are operated when the controller occupies the positions a, b and c. It will further be understood that the field-magnet winding 44 will be over-excited by "field-forcing" means, as is explained in my above-mentioned application.

In the position c, too, a circuit is established from the line conductor 30, through the contact member 28, the controller 45, the contact member 50, the relay 49, the actuating coil of the switch 22 and the relay 63, which, at this time, occupies its upper position, to the line conductor 29. If the voltage of the generator exceeds a predetermined value, the relay 49 will be actuated to open this circuit. So long as the voltage is below this value, however, the switch 22 will be closed to short-circuit the additional resistor 23. This short-circuiting operation is, in effect, itself, a "field-forcing" step. The resistor 23 thus serves, during acceleration, both as a "field-forcing" means and as a regulating means, dependent upon the value of the generator voltage.

When the controller is actuated to the position d, portions of the resistors 39 and 40 are inserted into circuit with the field-magnet windings 37 and 41, respectively. When the controller 45 occupies the position e, the remaining portions of these resistors are inserted into circuit. The excitation of the field-magnet windings 37 and 41 is thereby decreased and the motor M permitted to accelerate to its maximum speed.

If, during the acceleration of the motor, the current traversing the circuit of the armatures of the motor M and the generator G exceeds a predetermined value, the relay 60 will be opened and the relays 61 and 62 will be closed. The relay 62 should operate at a lower current value than the relay 60, so that the motor may develop its maximum torque before the generator field is weakened and the voltage consequently reduced. The opening of the relay 60 will effect the opening of the circuit of the actuating coil of the switch 12 to cause the insertion, into the circuit of the field-magnet winding 44, of the resistor 13 to cause a decreased excitation of the generator field and a corresponding decrease in the motor speed. The operation of the relay 61 is without effect, at this time, because the relay 63 occupies its normal, illustrated position. The closing of the relay 62 effects the energization of the actuating coils of the switches 31 and 32. The closing of the switch 32 results in short-circuiting the resistor 21, the circuit of the field-magnet winding 41 extending, at this time, from the line conductor 30, through the switch 32 and the field-magnet winding 41, to the line conductor 29. The closing of the switch 31 similarly effects the short-circuiting of the resistor 30, the circuit of the field-magnet winding 37 extending from the contact members 6 and 7, which are respectively connected to opposite terminals of the exciter armature, through the contact member 8, the field-magnet winding 37 and the resistor 29, to the switch 31 in opposite directions. The short-circuiting of the resistors 21 and 30 causes an increased excitation of the field-magnet windings 41 and 37, and a consequent decrease in the motor speed and increase in the motor torque. The switches 12, 31 and 32 operate in the manner of fluttering relays during such time as the current values in the main circuit exceed the predetermined value. In this manner, the current traversing the main circuit is automatically maintained within predetermined limits.

The above-described control of the resistor 30 is particularly valuable because the field-magnet winding 37, being in the nature of a series field-magnet winding, has a low inductance so that the excitation of this field-magnet winding usually changes much more rapidly than the excitation of the field-magnet winding 41. The short-circuiting of the resistor 30, therefore, adds to the time saved in bringing the motor M to normal speed.

It will be obvious that, instead of a step-by-step operation, as described, the operation of the controller 45 may be effected to the position e, or to any intermediate position, in one step. In the latter event, the above-described operations will take place automatically and in sequence.

When it is desired to stop the motor, the controller is actuated toward its "off" position. The motor will operate as a generator when its counter-electromotive force exceeds the generator voltage. As the controller is actuated gradually to its inoperative position, the resistors 39, 40 and 43 will be controlled in a manner substantially inverse to that during acceleration. The motor fields will be strengthened to increase the voltage of the motor, and the generator field will be weakened to permit a correspondingly heavier current to traverse the main circuit, which constitutes a regenerating circuit for the motor.

As the actuating coils of the relay 63 will now aid each other, because the current now traverses the main circuit in the opposite direction, with respect to voltage of the generator G, the relay 63 will be closed. The switch 22 will, therefore, be opened and will remain open during the decelerating operation. The switches 12, 31 and 32 will operate, as before described in connection with the acceleration of the motor, when the current traversing the main circuit exceeds a predetermined value. The switches 31 and 32 will have a tendency to "force" the strengthening of the motor fields. The closing of the relay 61, under the same conditions, will now effect the energization of the actuating coils of the switches 19 and 17, the circuit of these coils extending from the line conductor 30, through the coils, the relay 61 and the relay 63, in its lower position, to the line conductor 29. The switches 19 and 17 will thereupon be closed to short-circuit, respectively, the field-magnet windings 44 and 37. At this time, it will be noted, the resistor 23 will be retained in the circuit so as to protect the source of energy, to which the conductors 29 and 30 are connected, from a short-circuit. The resistor 29 will similarly protect the exciter E. As a result of the short-circuiting of the field-magnet winding 37, the rate of change of the excitation of this winding is, in a very short space of time, converted from a normal value to a very low value, which prevents the current traversing the circuit of the armatures exceeding a predetermined value during deceleration. As the switches 19 and 17 will flutter in accordance with the fluttering of the relay 61, the field-magnet windings 44 and 37 will be alternately short-circuited and reinserted into circuit, in accordance with the value of the current traversing the main circuit. The intermittent closing of a short-circuit across these fields prevents the changes in the external circuit of the field-magnet winding from affecting the rate of change, to an appreciable extent, when the field-magnet windings are short-circuited.

In order to obtain the effects of both the relays 61 and 62 during deceleration, the relay 61 should be designed to operate at a higher current value than the relay 62.

If the excitation of the field-magnet winding 41 builds up too rapidly, which, of course, the short-circuiting of the field-magnet winding 44 cannot control, the resulting effect will be counteracted by the switch 17, which effects the short-circuiting of the field-magnet winding 37. The winding 37 is disconnected from the source of power during deceleration because the switch 33 is open, the coils 65 and 66 aiding each other. The short-circuiting of this winding 37 makes effective a transformer action between the windings 37 and 41, the winding 37 acting as a choke coil, when short-circuited, thereby preventing the excitation of the field-magnet winding 41 from building up too quickly. The rate of change of this excitation, therefore, will be controlled in accordance with the value of the current traversing the circuit of the generator and the motor armatures.

When it is desired to operate the motors in the opposite direction, the controller 45 will be actuated to the left. The connections for the generator field-magnet winding 44 and the motor field-magnet winding 37 will thereby be reversed. The direction of the electromotive force of the field-magnet winding 44 will thereby be reversed to cause a reversal of the direction of the electromotive force applied to the armature of the motor M. The current traversing the field-magnet winding 38 of the exciter E is also reversed so that, as the connections of the field-magnet winding 37 are reversed, the direction of current flow through the winding 37 will remain unchanged. There is a possibility, however, that the current flow through the field-magnet winding 37 may, temporarily, be reversed, which would cause the windings 37 and 41 to oppose each other. Simultaneously with such reversal, however, the current flow through the coil 66 would then aid the coil 65, and the relay 64 would therefore be opened to cause the opening of the circuit of the actuating coil of the switch 33, thereby breaking the connection between the exciter E and the field-magnet winding 37. The coil 66 is connected to the contact members 5 and 8, so that its excitation will be in the proper direction when the current in the winding 38 is reversed and the master switch 45 is actuated in the opposite direction. The relay 64, therefore, operates only when the voltage applied to the field-magnet winding 37 and the resistor 39 is reversed with respect to the voltage of the conductors 29 and 30. Not until the field-magnet winding 37 is energized in the proper direction, therefore, will the coil 66 again oppose the coil 65, whereupon the relay 64 will be closed to energize again the actuating coil of the switch 33, thereby again effecting the connection of the field-magnet windings 37 to exciter E.

The motor M will now operate in the reverse direction since the current through its armature winding is reversed, while the direction of current through the field-magnet windings 37 and 41 remains the same. The operation is otherwise as described above in connection with the acceleration of the motor in the forward direction.

I have thus provided a control system for a motor and a generator by means of which the acceleration and the deceleration of the motor may be effected much more rapidly than has hitherto been found possible. I have simplified the drawing wherever possible and have omitted many details which may be found in my above-mentioned application. I desire that my invention be construed as broadly as is indicated in the appended claims.

I claim as my invention:

1. The combination with a pair of dynamo-electric machines having armatures connected in series, one of said machines having a variable-potential field-magnet winding, of means for increasing the excitation of said winding when the current traversing said armatures exceeds a predetermined value.

2. The combination with a motor and a generator having armatures connected in series and field-magnet windings, of means for decelerating said machines and, during the decelerating operation, increasing the excitation of said motor winding when the current traversing said armatures exceeds a predetermined value and short-circuiting said generator winding when the current traversing said armatures exceeds a second predetermined value.

3. The combination with an electric motor having an armature and a pair of separately-excited field-magnet windings, of means, operable when said motor operates as a generator, for short-circuiting one of said windings when the current traversing said armature exceeds a predetermined value.

4. The combination with a dynamo-electric machine having a pair of field-magnet windings, means for exciting said windings, means for reversing the connections of one of said windings and means for reversing the operation of said exciting means for said one winding, of means for preventing a relative change in the direction of current flow through said windings.

5. The combination with a dynamo-electric machine having a field-magnet winding and a resistor in circuit therewith, of means for short-circuiting said resistor under predetermined conditions during the acceleration only of said machine and means for short-circuiting said winding under predetermined conditions during the deceleration only of said machine.

6. The combination with a dynamo-electric machine having a resistor associated therewith, of means for short-circuiting a portion of said resistor to accelerate said machine and means for short-circuiting an additional portion of said resistor to further accelerate said machine when the voltage of said machine is below a predetermined value and only after said first-named portion has been short-circuited.

7. The combination with a dynamo-electric machine having a resistor associated therewith, of means for employing said resistor to force the field of said machine and to regulate said machine during acceleration and means for maintaining said resistor in circuit during deceleration.

In testimony whereof, I have hereunto subscribed my name this 26 day of Feb. 1919.

EDWIN S. LAMMERS, Jr.